United States Patent [19]

Moore

[11] Patent Number: 5,477,282

[45] Date of Patent: Dec. 19, 1995

[54] SPEECH PROMPTER

[75] Inventor: Thomas S. Moore, Northville, Mich.

[73] Assignee: Detroit Innovative Products Company, Northville, Mich.

[21] Appl. No.: 282,874

[22] Filed: Jul. 29, 1994

[51] Int. Cl.[6] .......................... G03B 31/00; G03B 21/00
[52] U.S. Cl. .................................. 352/4; 353/122
[58] Field of Search .......................... 352/4, 15–17, 352/243; 353/15–19, 122

[56] References Cited

U.S. PATENT DOCUMENTS

| | | | |
|---|---|---|---|
| 2,635,373 | 4/1953 | Barkau | 352/4 |
| 2,696,753 | 12/1954 | Segal et al. | 352/4 |
| 2,711,667 | 6/1955 | Simjian | 352/4 |
| 2,837,294 | 6/1958 | Jacobs, III | 352/4 |
| 2,860,544 | 11/1958 | Kahn | 352/4 |
| 3,972,603 | 8/1976 | Lubinec | 352/4 |
| 4,027,958 | 6/1977 | Shigeta et al. | 352/17 |
| 4,319,812 | 3/1982 | Williams | 352/17 |
| 4,660,107 | 4/1987 | Chippendale, Jr. | 360/14.3 |
| 4,728,184 | 3/1988 | Kyhl | 353/122 |
| 5,266,980 | 11/1993 | Gussin et al. | 353/12 |
| 5,373,333 | 12/1994 | Kawada et al. | 353/122 |

*Primary Examiner*—Michael L. Gellner
*Assistant Examiner*—Eddie C. Lee
*Attorney, Agent, or Firm*—Robert G. Mentag

[57] ABSTRACT

A personal use, low cost, portable speech prompter which is light in weight and small in size. The speech prompter includes a support frame on which is mounted a light box with a horizontal translucent top wall. A transparent film with a speech printed thereon is slidably mounted, upside down, on the light box top wall. An image of the speech printed on the transparent film is reflected upwardly to a see-through view screen which reflects the speech image rearwardly along a line of sight between a speaker and the see-through view screen.

9 Claims, 3 Drawing Sheets

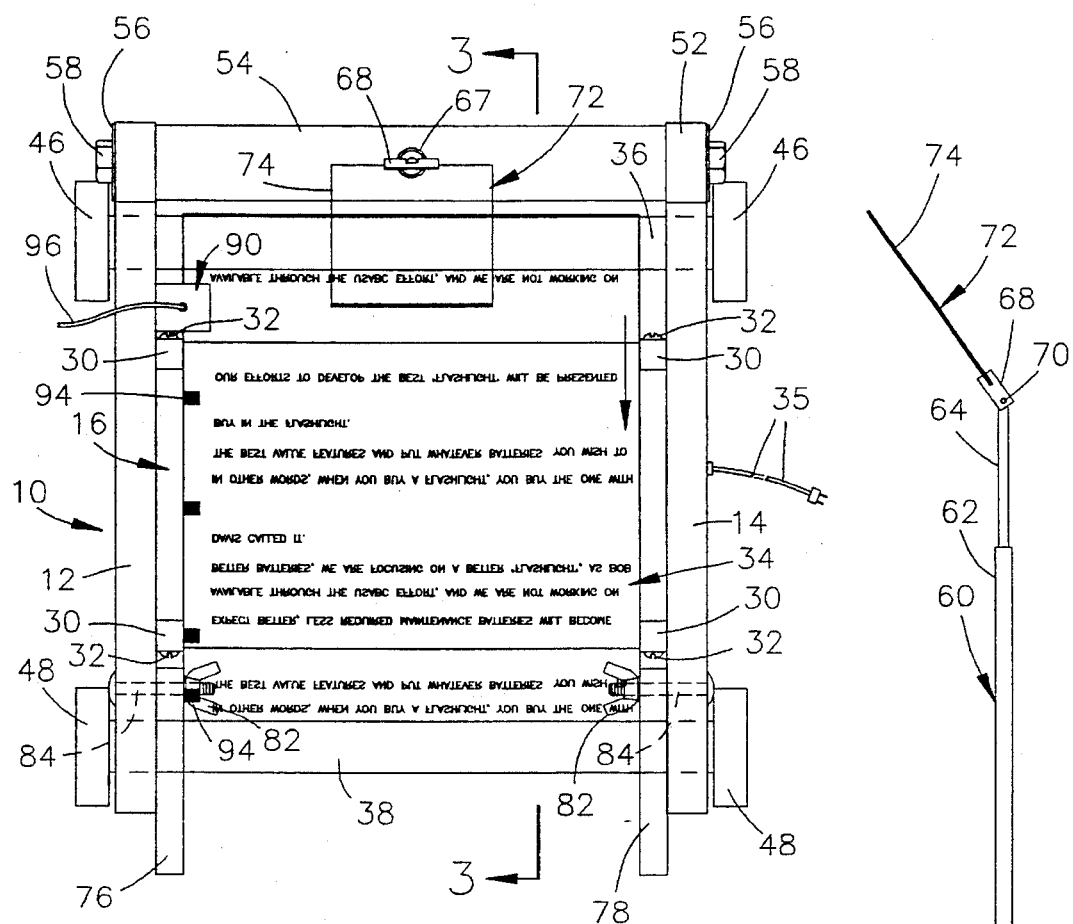
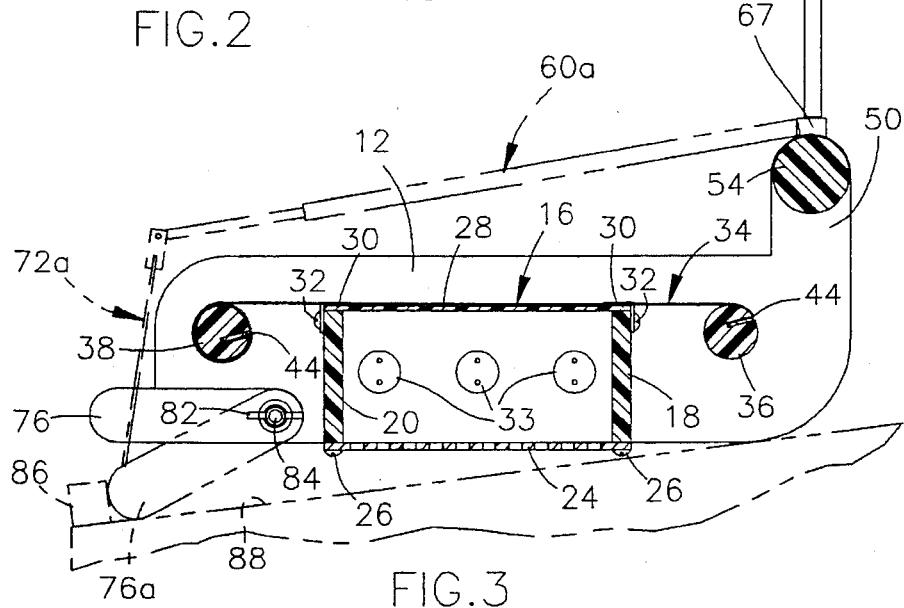

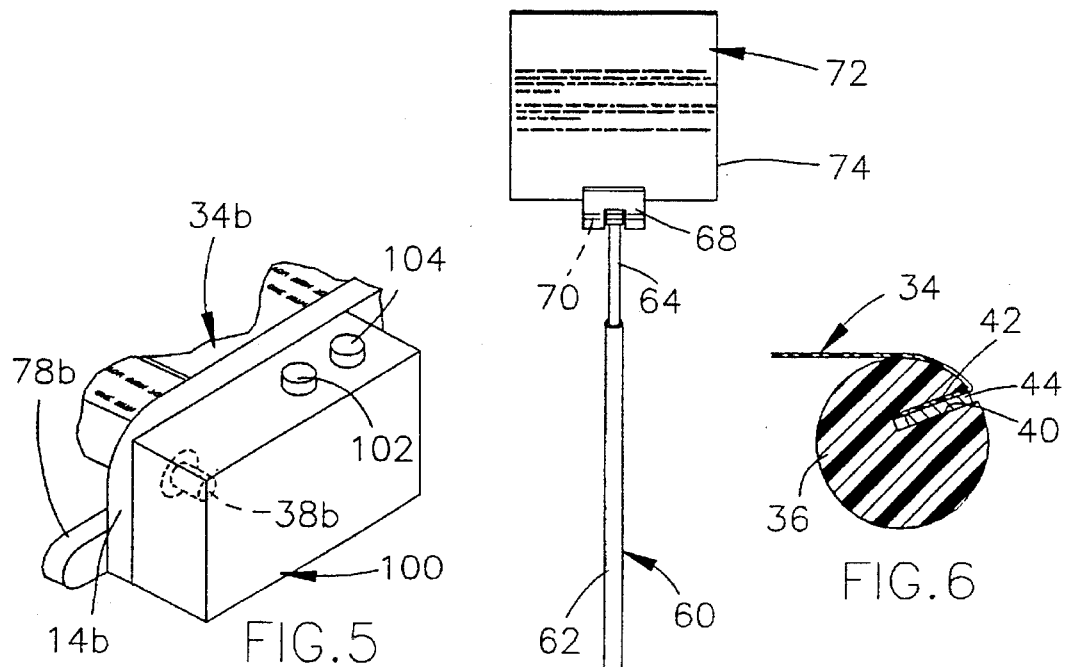
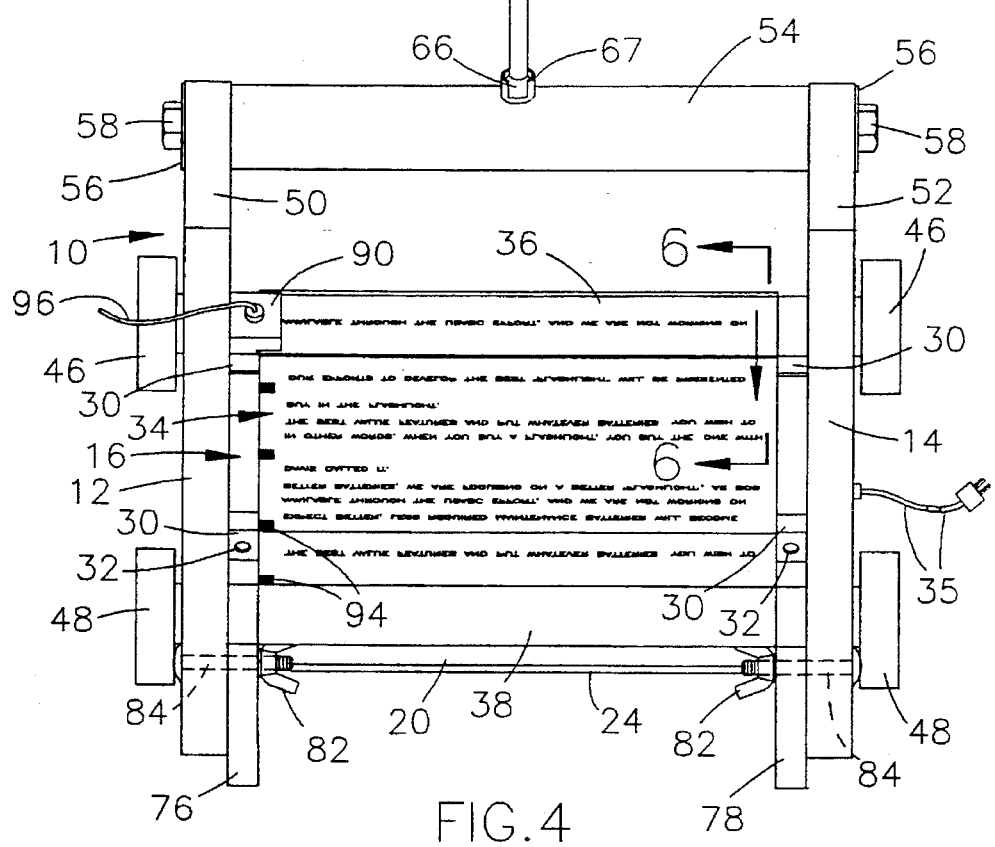

SPEECH PROMPTER

BACKGROUND OF THE INVENTION

1. Field of the Invention

The field of art to which this invention pertains may be generally located in the class of devices relating to speech prompters. Class 40, Card, Picture and Sign Exhibiting, United States Patent Office Classification appears to be the applicable general area of art to which the subject matter similar to this invention has been classified in the past.

2. Description of the Prior Art

The commercial teleprompting equipment available at the present time have many shortcomings, including the fact that they are very expensive, and require an operator to run them. A speaker cannot run the prior art teleprompters by himself. A further shortcoming of the prior art teleprompters is that they are heavy and difficult to transport.

It is an object of the invention to provide a personal use, low cost, portable speech prompter which is adapted to perform a prompting operation as efficiently as the larger, expensive and difficult to transport teleprompters.

It is another object the invention to provide a speech prompter of a very small size, which is light in weight, and which is adjustable to a portable fold-down, briefcase size easy for transporting.

SUMMARY OF THE INVENTION

The aforegoing objects are accomplished by providing a speech prompter which employs a full size clear transparent film on which is printed in black the text of a speech. In use, the transparent film is turned upside down and the text of the speech thereon is reflected directly onto a see-through view screen. The transparent film is disposed over a horizontal lighted background which uses a very white diffuser to create a black-on-white readable image.

The speech prompter includes a support frame having a pair of laterally spaced apart frame side members between which is mounted a light box having an electric light means positioned therein. The light box is provided with a white translucent top wall. A film supply roller is operatively mounted on the support frame in a position in front of the light box. A film supply roller is operatively mounted on the support frame in a position to the rear of the light box. A transparent film having the text of a speech printed thereon is slidably mounted, in an upside down position on the light box white translucent top wall. The trailing end of the transparent film is affixed to the film supply roller, and the transparent film is rolled up onto the film supply roller with the leading end thereof, releasably affixed to the film take-up roller. A see-through view screen is adjustably mounted on a support rod which has its lower end adjustably mounted on the support frame. The text printed on the transparent film is reflected directly upward to the see-through view screen, from where it is reflected along a line of sight between a speaker, standing at the rear of the prompter, and the see-through view screen. The take-up film roller is provided with a pair of control knobs for turning the same to advance the transparent film over the light box, as desired by the speaker. Alternatively, the control knobs for advancing the transparent film may be replaced by an electric motor for selectively advancing the film as desired by a speaker. It will be understood that a speaker using the speech prompter would adjust the position of the see-through view screen in accordance with the optimum position for viewing by the speaker.

The speech prompter is provided with adjustable leg means for positioning the speech prompter on the podium, or the like, with the light box white translucent top wall in a level position.

The transparent film may be provided with black spots which are sensed by a photo-electric cell sensor to provide change signals, for operating a slide projector when a speaker at certain times during presentation of a speech.

BRIEF DESCRIPTION OF THE DRAWINGS

FIG. 2 is a top view of the speech prompter illustrated in FIG. 1.

FIG. 3 is an elevation section view of the speech prompter illustrated in FIG. 2, taken along the line 3—3 thereof, and looking in the direction of the arrows.

FIG. 4 is an isometric view of the speech prompter shown in FIGS. 1 and 2, as viewed by a speaker using the speech prompter.

FIG. 5 is a fragmentary, perspective view of the lower rear corner of the speech prompter illustrated in FIGS. 1, 2 and 4, and showing a modification thereof, wherein the take-up roller for advancing the transparent film employed in the speech prompter is operated by an electric motor instead of a manual control knob.

FIG. 6 is a fragmentary, enlarged, elevation section view of the speech prompter illustrated in FIG. 4, taken along the line 6—6 thereof, looking in the direction of the arrows, and showing a cross section of the film supply roller and the connection thereto of one end of the transparent film employed in the invention.

DESCRIPTION OF THE PREFERRED EMBODIMENTS

Figure 1:
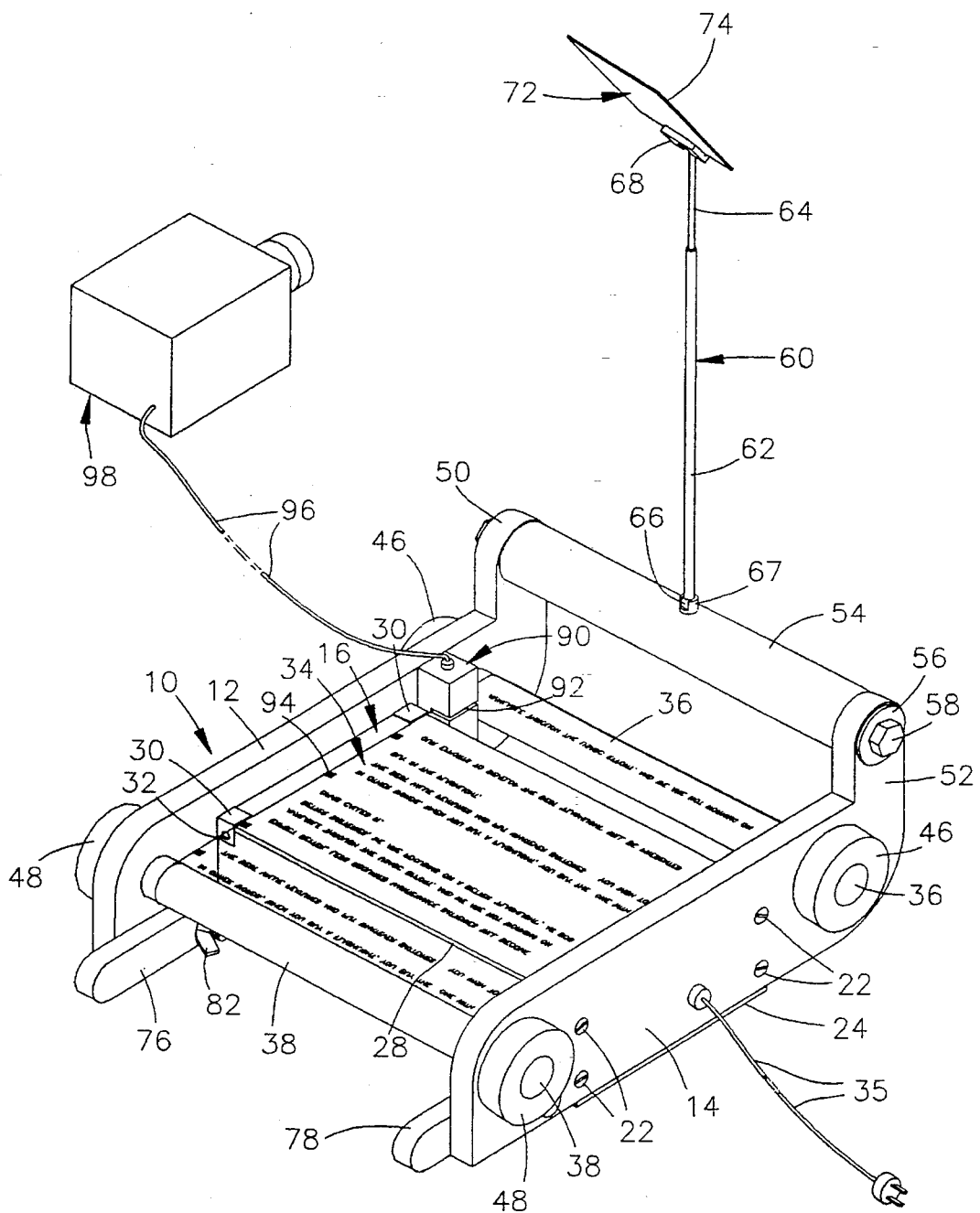
FIG. 1 is a perspective view of a speech prompter made in accordance with the principles of the present invention.

Referring now to the drawings, and in particular to FIGS. 1, 2 and 4, the numeral 10 generally designates a speech prompter made in accordance with the principles of the present invention. As best seen in FIG. 1, the speech prompter 10 includes a pair of laterally spaced apart, elongated support frame side members indicated by the numerals 12 and 14. The support frame side members 12 and 14 are rectangular in vertical cross section with the longer dimension being vertically disposed. A light source or light box, generally indicated by the numeral 16, is mounted between the support frame side members 12 and 14.

As illustrated in FIG. 3, the light box 16 includes a front transverse end wall 18, and a rear transverse end wall 20 which is spaced apart from the front end wall 18. The light box front and rear end walls 18 and 20 are fixedly connected to the support frame side members 12 and 14 by any suitable means, as by suitable screws 22, illustrated in FIG. 1. As shown in FIG. 3, the lower end of the light box 16 is enclosed by a bottom wall 24, which is releasably secured to the lower ends of the front and rear end walls 18 and 20 by suitable screws 26. The support frame side members 12 and 14 function as the side walls for the light box 16. The support frame side members 12 and 14, the light box front and rear end walls 18 and 20, and the light box bottom wall 24 may be made from any suitable opaque material, as for example a suitable plastic, a lightweight metal or wood. As shown in FIG. 3, a plurality of suitable lamps, such as fluorescent lamps 33, are operatively mounted in the light box 16 and are provided with a suitable power supply cord indicated by the numeral 35 (FIG. 2). As shown in FIGS. 1 and 3, the top side of the light box 16 comprises a lighted window area which is enclosed by a top wall 28, having a flat plane transparency surface, and comprising a suitable translucent material which functions as a very white diffuser of the light provided by the plurality of fluorescent tubes 33. The light box translucent top wall 28 is releasably mounted in place on the front and rear light box walls 18 and 20, respectively, by any suitable means, as by a plurality of L-shaped retainer clips 30 that are secured to said light box walls 18 and 20 by suitable screws 32 (FIGS. 1 and 3).

Slidably mounted on the flat plane transparency wall 28 of the light box 16 is a transparent film 34 which is approximately full size in width (8½ inches wide). The text of the notes or speech material for a speaker is printed on the transparent film 34 by any suitable means, as by a computer. The transparent film 34 with the text material thereon is positioned over the light box 16, in an upside down position. A suitable transparent film 34 is a transparent film sold by the Visual System Division of the Minnesota Mining and Manufacturing Company of Austin, Tex., under Model No. PP2200.

As best seen in FIG. 2, the speech prompter 10 includes a front film supply roller 36 which extends between the side walls 12 and 14 and has its ends rollably mounted through suitable bores formed through said side walls. The speech prompter 10 further includes a rear take-up roller 38 which also extends between the side walls 12 and 14 and has its ends rollably mounted through suitable bores formed through said side walls. The trailing end 42 of the transparent film 34, is attached to the supply roller 36 and the film 34 is then rolled up on the roller 36. The leading end of the transparent film 34 is then attached to the sear takeup roller 38 which may also be termed the drive roller.

As illustrated in FIG. 6, the trailing end or rear end 42 of the transparent film 34 is folded into an angled slot 40 formed lengthwise in the rear or supply roller 36, and it is held in place by an elongated strip of suitable material 44, which may be called a keeper member, and which holds the trailing end 42 of the film 34 in the slot 40 by a releasable friction fit. The leading or front end of the transparent film 34 is also releasably secured in a lengthwise slot in the drive or take-up roller 38 by an identical keeper member 44 (FIG. 3).

As shown in FIGS. 1, 3 and 4, the supply roller 36 is provided on each of the outer ends thereof with a control knob 46 for manually rotating the roller 36 in a desired direction of rotation. The drive or take-up roller 38 is also provided on each of the outer ends thereof with a control knob 48 for manually rotating the roller 38 to advance the transparent film 34 toward the speaker, in the direction of the arrow shown on the film 34 in FIGS. 1, 3 and 4.

As best seen in FIG. 1, each of the support frame side walls 12 and 14 has integrally formed on the front end thereof an upwardly extended, vertical support arm, 50 and 52, respectively. A transverse support rod 54 is mounted between the upper ends of the frame vertical support arms 50 and 52. The ends of the transverse support rod 54 are releasably secured to the upper ends of the respective support frame vertical support arms 50 and 52 by any suitable means, as by a suitable washer 56 and a bolt 58.

As best seen in FIGS. 1 and 4, a telescopic support rod, generally indicated by the numeral 60, is mounted vertically on the transverse support rod 54. The support rod 60 has a lower support rod member 62. An upper support sod member 64 is telescopically mounted in the upper end of the lower support rod member 62. As indicated in FIG. 4, a pivot ball means 66 is carried on the lower end of the lower support rod member 62, and it is mounted in a mating or complementary cup member 67 that is fixedly mounted on the transverse rod 54, and which has an opening on the rear side thereof to permit the support rod 60 to be adjusted toward a speaker using the speech prompter 10.

As best seen in FIGS. 3 and 4, a see-through view screen, generally indicated by the numeral 72, is adjustably mounted on the upper end of the upper support rod member 64 by a bracket 68. The lower end of the bracket 68 is pivotally mounted by a transverse roll pin 70 onto the upper end of the upper support rod member 64. The see-through view screen 72 is releasably secured in a suitable slot formed in the upper end of the bracket 68, by any suitable means, as by being glued or clamped in place. The perimeter or outer edge 74 of the see-through view screen 72 is preferably painted black, to exclude ambient light and provide optimum viewing of the text reflected onto the view screen 72 from the transparent film 34. The see-through view screen 72 is made from any suitable reflecting, transparent material, such as glass or acrylic plastic. A preferable reflecting, transparent material is a polycarbonate material which is available on the market under the trademark "LEXAN", from the Plastics Division of the General Electric Company, of Pittsfield, Mass. The see-through view screen 72 is rigid, and it is preferably made to a thickness of between 30 and 60 thousandths of an inch.

As shown in FIGS. 1, 3 and 4, the speech prompter 10 is provided with a pair of adjustable legs 76 and 78. The adjustable legs 76 and 78 are pivotally mounted on the inside surfaces of the support frame side walls 12 and 14. Each of the adjustable legs 76 and 78 is adjustably mounted in place on its respective side wall 12 or 14 by a suitable bolt 84 (FIGS. 3 and 4). The bolts 84 are mounted in the support frame side walls 12 and 14 and have a threaded end protruding inwardly on which is threadably mounted a suitable wing nut 82 for coaction with the bolts 84 to hold the legs 76 and 78 in a desired adjusted position.

As shown in FIG. 3, the adjustable legs 76 and 78 are adapted to keep the speech prompter 10 from sliding off the edge of the sloping top surface 88 of a speaker's podium, and also to keep the speech prompter level. The numeral 86 in FIG. 3 illustrates a transverse strip of material that is normally positioned on the rear end of a podium sloping surface 88. The numeral 76a designates the positions that the adjustable legs 76 and 78 would be adjusted to, and secured in place by the wing nuts 82, to seat the adjustable legs 76 and 78 against the end strip of material 86 to maintain the speech prompter 10 in the level operative position shown in FIG. 3.

As best seen in FIG. 1, the speech prompter 10 includes a photo-electric cell sensor, generally indicated by the number 90, which is fixedly mounted, by any suitable means, on the inside surface of the support frame side wall 12. The photo-electric cell sensor 90 is provided with a horizontal slot 92 through which the left edge (as viewed in FIG. 1) of the transparent film 34 slides as it is moved. A plurality of black dots are put on the left edge of the transparent film 34, in certain positions for operating the photo-electric sensor 90 at desired portions of the text of the speech on the transparent film 34. The photo-electric cell sensor 90 is operatively connected by a suitable lead wire 96 to a conventional automatic slide projector, generally indicated by the numeral 98. It will be seen that when a black dot 94 slides through the photo-electric cell sensor 90, an automatic slide projector control change signal is generated, and it is transmitted through the lead wire 96 to the automatic slide projector 98 to operate the same and project a desired slide onto a slide viewing screen at a point in time, during the delivery of the speech by a speaker, commensurate with the speech text. The black dots 94 may be put on the transparent film 34 by the person putting the text of a speech on the transparent film 34. A suitable photo-electric cell sensor 90 is available on the market from Motorola Lighting, Inc. of 887 Deerfield Parkway, Buffalo Grove, Ill., 60089 under Model No. 21A1.

FIG. 5 is a fragmentary, perspective view of the rear right corner of the speech prompter 10, and showing a suitable electric drive motor, generally indicated by the numeral 100, mounted on the right end of the drive or take-up roller 38, to replace the manual control knob 48 as illustrated in FIG. 1. The electric drive motor 100 may be any suitable drive motor having a push button "run" switch 102, and a push button "stop" switch 104. The parts of the speech prompter 10 to which the electric motor 100 is mounted have been marked with the same reference numerals as used in the description of the first embodiment illustrated in FIGS. 1, 2 and 4, followed by the small letter "b".

The speech prompter 10 of the present invention may be folded and put in a carrying case, such as a brief case, for transporting the same. FIG. 3 illustrates how the see-through view screen support rod 60 may be folded down, to the dotted line position indicated by the numeral 60a. The numeral 72a illustrates how the see-through view screen 72 may be folded downwardly to a position for transporting the speech prompter 10.

In the use of the speech prompter 10, the speaker may have the text of his speech put on the transparent film 34 by a computer printout process, and also include the slide projector black control spots 94 at the appropriate positions along the text. The text can be printed with large letters to a size so that the speaker can read the text without eyeglasses, if they are persons who do not like to wear eyeglasses all of the time, but need to put them on when they are going to give a speech. Also, there are many speakers who would rather be in front of an audience without their reading glasses on when giving a speech. The transparent film 34, with the text of the speech and the slide projector black control spots 94 marked thereon, is mounted on the supply roller 36 in an upside down position, and with the leading end releasably secured to the rear roller 38. The speech prompter see-through view screen rod 60 may be folded into the broken line position 60 as shown in FIG. 3, and the speech prompter 10 may be put in a briefcase for transporting the same to the location where the speaker is to deliver a speech. The simple and compact structure of the speech prompter 10 permits the aforedescribed fold-down condition to allow quick and easy transporting of the same. When the speaker is at the site where he is to deliver his speech, the speech prompter 10 may be mounted on a flat surface, or on a podium sloping surface, as shown in FIG. 3. In either case the speech prompter 10 would be positioned so that the upper wall 28 of the light box 16 is in a horizontal position to create a flat plane transparency surface. The speaker then adjusts the see-through view screen 72 vertically and forward and away from him, to accomodate his size and delivery preference. The light box 16 provides an upwardly directed lighted background for the transparent film 34 to create a black-on-white reversed image of the text on the transparent film 34 which is reflected directly upward onto the see-through view screen 72 and reflected to the eyes of the speaker. A unique feature of the invention is the use of the lighted background, employing a very white diffuser, to create a black-on-white readable text. As viewed in FIGS. 1, 2 and 4, the upside down positioned transparent film 34 is advanced toward the speaker when the speaker manually rotates one of the control knobs 48 on the take-up roller 38. Alternatively, the transparent film 34 may be advanced, as desired by the speaker by the use of an electric motor 100, as shown in the embodiment of FIG. 5.

What is claimed is:

1. A speech prompter (10), comprising:

(a) a support frame means including a pair of laterally spaced apart frame side members (12,14) and a front end transverse support rod (54);

(b) a light box (16) supported by said frame side members (12,14) and having a front end and a rear end, and having an electric light means (33) mounted therein, and a horizontal white translucent top wall (28);

(c) a film supply roller (36) operatively mounted on said support frame side members (12,14) in a transverse position spaced apart forward from the front end of the light box (16), and a film take-up roller (38) operatively mounted on said support frame side members (12,14) in a transverse position spaced apart rearward from the rear end of the light box (16);

(d) a transparent film (34) having a trailing end (42) and a leading end and having a text of a speech printed thereon and being slidably mounted, upside down, on the light box white translucent top wall (28), and having the trailing end thereof releasably affixed to the film supply roller (36) and rolled up onto said film supply roller (36), and with the leading end thereof releasably affixed to the film take-up roller (38);

(e) a see-through view screen support rod (60) having an upper end, and a lower end pivotally mounted on the support frame means transverse support rod (54) for folding the see-through view screen support rod (60) to a position over the light box (16) to allow quick and easy transporting of the speech prompter (10);

(f) a see-through view screen (72), having a peripheral edge, and being adjustably mounted on the upper end of said see-through view screen support rod (60) above the light box translucent top wall (28), and which see-through view screen (72) reflects the text of the speech printed on the transparent film (34) that is reflected upwardly from the light box (16), along a line of sight between a speaker, standing at the rear end of the light box (16), and the see-through view screen (72); and, (g) control means attached to the take-up roller (38) for advancement of the transparent film (34) over the light box white translucent top wall (28) by a speaker.

2. A speech prompter (10) as defined in claim 1, wherein:

(a) said see-through view screen (72) is adjustably mounted on the upper end of said see-through view screen support rod (60) for forward and backward adjustability.

3. A speech prompter (10) as defined in claim 2, wherein:

(a) the lower end of said see-through view screen support rod (60) is provided with a pivot ball means (66) on the lower end thereof which is mounted in a mating cup member (67) that is mounted on the support frame means transverse support rod (54).

4. A speech prompter (10) as defined in claim 1, wherein:

(a) the see-through view screen support rod (60) includes a lower support rod member (62) that is provided with a pivot ball means (66) on the lower end thereof which is mounted in a mating cup member (67) that is mounted on the support frame means transverse support rod (54), and an upper support rod member (64) telescopically mounted in the lower support rod member (62) and having the see-through view screen (72) adjustably mounted on the upper end thereof.

5. A speech prompter (10) as defined in claim 1, wherein:
(a) said support frame means is provided with a pair of pivotally mounted, adjustable legs (76,78) for adjusting the support frame means to position the light box (16) white translucent top wall (28) in a level position during use of the speech prompter, and said adjustable legs are each provided with holding means (82,84) for retaining the legs in a selective adjusted position.

6. A speech prompter (10)) as defined in claim 1, wherein:
(a) the transparent film (34) is provided with a plurality of longitudinally spaced apart black dots (94) on one edge thereof; and,
(b) a photo-electric cell sensor (90) is mounted on said support frame means in a position adjacent said one edge of the transparent film (34) having the black dots (94), and with said one edge of the transparent film (34) being adapted to pass through the photo-electric cell sensor (90) to generate a control change signal for transmission to a slide projector to operate the slide projector at selected times during a speech given by a speaker using the speech prompter (10).

7. A speech prompter (10) as defined in claim 1, wherein:
(a) the peripheral edge (74) of the see-through view screen (72) is darkened with a black material to exclude any ambient light from entering into the see-through view screen (72) from the peripheral edge thereof.

8. A speech prompter (10) as defined in claim 1, wherein:
(a) the control means attached to the take-up roller (38) for advancing the transparent film (34) comprises a manually operated control knob.

9. A speech prompter (10) as defined in claim 1, wherein:
(a) the control means attached to the take-up roller (38) for advancing the transparent film (34) by the speaker comprises an electrical drive motor.

* * * * *

UNITED STATES PATENT AND TRADEMARK OFFICE
CERTIFICATE OF CORRECTION

PATENT NO. : 5,477,282
DATED : Dec. 19, 1995
INVENTOR(S) : Thomas S. Moore

It is certified that error appears in the above-indentified patent and that said Letters Patent is hereby corrected as shown below:

Column 3, line 33, "sear" should be --rear--.

Column 3, line 66, "sod" should be --rod--.

Signed and Sealed this

Twenty-sixth Day of March, 1996

Attest:

BRUCE LEHMAN

*Attesting Officer*  *Commissioner of Patents and Trademarks*